(12) United States Patent
Shanmugam et al.

(10) Patent No.: US 8,782,802 B2
(45) Date of Patent: Jul. 15, 2014

(54) METHOD AND SYSTEM FOR PROVIDING A REL TOKEN

(75) Inventors: Murugaraj Shanmugam, Bonn (DE); Hannes Tschofenig, Espoo (FI)

(73) Assignee: Siemens Aktiengesellschaft, Munich (DE)

(*) Notice: Subject to any disclaimer, the term of this patent is extended or adjusted under 35 U.S.C. 154(b) by 487 days.

(21) Appl. No.: 12/594,331

(22) PCT Filed: Apr. 2, 2008

(86) PCT No.: PCT/EP2008/053928
§ 371 (c)(1),
(2), (4) Date: Oct. 1, 2009

(87) PCT Pub. No.: WO2008/119817
PCT Pub. Date: Oct. 9, 2008

(65) Prior Publication Data
US 2010/0088506 A1    Apr. 8, 2010

(30) Foreign Application Priority Data
Apr. 3, 2007 (DE) .......................... 10 2007 016 117

(51) Int. Cl.
*H04L 29/06* (2006.01)
*G06F 21/00* (2013.01)

(52) U.S. Cl.
USPC ............................. 726/27; 713/167; 705/59

(58) Field of Classification Search
None
See application file for complete search history.

(56) References Cited

U.S. PATENT DOCUMENTS

| | | | |
|---|---|---|---|
| 7,962,953 B2* | 6/2011 | Chandra et al. | 726/4 |
| 2005/0216901 A1* | 9/2005 | Speare et al. | 717/168 |
| 2006/0206931 A1 | 9/2006 | Dillaway et al. | |
| 2008/0046758 A1* | 2/2008 | Cha et al. | 713/189 |

FOREIGN PATENT DOCUMENTS

CN    1671097    9/2005

OTHER PUBLICATIONS

DeMartini et al., Web Services Security Rights Expression Language (REL) Token Profile 1.1 [online], Feb. 1, 2006 [retrieved on Apr. 18, 2014]. Retrieved from the Internet: <URL https://www.oasis-open.org/committees/download.php/16687/oasis-wss-rel-token-profile-1.1.pdf>.*
Michael McIntosh et al., "Basic Security Profile Version 1.0", Web Services Interoperability Organization Internet: http://web.archive.org/web/20070322212225/http://www.ws-i.org/Profiles/BasicSecurityProfile-1.0.html, Feb. 20, 2007.
Oasis Open 2006: "Security Assertion Markup Language (SAML) V2.0 Technical Overview" SSTC-SAML-TECH-OVERVIEW-2.0-DRAFT-13, Feb. 21, 2007, pp. 1-50. URL:http://www.oasis-open.org/committees/download.php/22553/sstc-saml-tech-overview-2%200-draft-13.pdf.
Oasis Open 2002-2006: "Web Services Security Rights Expression Language(REL) Token Profile 1.1" WSS-V 1.1-SPEC-CS-REL-Token-PROFILE, Feb. 1, 2006, pp. 1-27, URL://www.oasis-open.org/committees/download.php/16687/oasis-wss-rel-token-profile-1.1.pdf.

(Continued)

*Primary Examiner* — Gilberto Barron, Jr.
*Assistant Examiner* — Malcolm Cribbs
(74) *Attorney, Agent, or Firm* — Staas & Halsey LLP

(57) ABSTRACT

The embodiments relate to a method for providing at least one REL (Rights Expression Language) token, the REL-token or tokens being provided in a message by a MIME (Multipurpose Internet Mail Extension) protocol.

11 Claims, 2 Drawing Sheets

(56) References Cited

OTHER PUBLICATIONS

Oasis Open 2005: "Bindings for the Oasis Security Assertion Markup Language (SAML) V2.0" SSTC-SSML-BINDINGS-2.0-CD-04, Jan. 17, 2005, pp. 1-46, URL:http://www.oasis-open.org/committees/download.php/11040/sstc-saml-bindings-2.0-cd-04.%20pdf.

H. Tschofenig: "SIP SAML Profile and Binding" INTERNET-DRAFT, DRAFT-IETF-SIP-SAML-01.TXT, Oct. 23, 2006, URL:http://tools.ietf.org/pdf/draft-ietf-sip-saml-01.pdf.

Standard: ISO/IEC 21000-5, Jul. 2005; Introducing MPEG-21 REL—An Overview.

Chinese Office Action mailed Jan. 31, 2012 issued in corresponding Chinese Patent Application No. 200880011177.4.

English Translation of Korean Office Action dated Jan. 28, 2014 in corresponding Korean Application No. 10-2009-7023004.

\* cited by examiner

METHOD AND SYSTEM FOR PROVIDING A REL TOKEN

CROSS REFERENCE TO RELATED APPLICATIONS

This application U.S. National State of International Application No. PCT/EP2008/053928, filed Apr. 2, 2008 and claims the benefit thereof. The International Application claims the benefit of German Application No. 10 2007 016 117.6 filed on Apr. 3, 2007, both applications are incorporated by reference herein in their entirety.

BACKGROUND

1. Field

The embodiments discussed herein relate to a method for providing a REL token. The embodiments discussed herein also relate to a use of the above-mentioned method for providing licensed application data. The embodiments discussed herein also relate to a system for providing the REL token and a system for providing the licensed user data 2. Description of the Related Art One of the problems underlying conventional approaches to rights management is described below by way of example based on a video rental store, which provides the films to be loaned by way of the internet.

A video rental store operates in the manner of a service provider to provide user data in the form of film clips, films or television programs. A customer or user can download these films to their player or computer. The films are typically coded with a license key. On payment of a fee the video rental store sends the customer the license key, thus granting him/her a license to watch the film.

For the customer to receive the key, he/she must register with the video rental store. In this process the customer typically gives their residence (authentication) and credit card number or bank details for accounting purposes.

So-called Rights Expression Language (REL) was introduced for the transfer of the license key. The REL creates a protocol specifying the form of the license key. The license key is embedded in a so-called REL token. The player or play program for the film must be set up to process the REL token to extract the license key.

In a further system the customer can use the received REL token a number of times to download further films from the service provider. The option of multiple use of the license key or REL token corresponds to a single sign on method, as the customer only has to register once (authentication).

A protocol for transmitting the REL token has been defined by a standardization organization OASIS. The REL token is transmitted using SOAP (Simple Object Access Protocol) web service security mechanisms. The SOAP web service security mechanisms are based on messages with messages of complex structure to meet the requirements of a large number of areas of application and security aspects. The processing of the SOAP protocol, the embedding and extracting of the REL token, therefore requires an outlay which results in a considerable load on processors and a high level of energy consumption for mobile terminals in particular. Also not all terminals are able to process SOAP-based protocols.

SUMMARY

One feature of the embodiments is to provide a REL token with a simplified protocol.

In a first aspect of the embodiments a method is provided for providing at least one REL (Rights Expression Language) token, the REL token having been provided in a message by a MIME (Multipurpose Internet Email Extension) protocol.

In one embodiment the REL token is provided in an email by the MIME protocol.

In a second aspect of the embodiments a method is provided for providing at least one REL (Rights Expression Language) token, the REL token being provided in a message by an SAML (Security Assertion Markup Language) protocol.

In one embodiment the REL token is embedded in an SAML assertion of the SAML protocol.

In one embodiment the REL token is embedded in an authorization decision statement of the SAML protocol.

In one embodiment the REL token is provided by a server, after a terminal has requested the REL token from the server.

In one embodiment the message with the REL token is provided in an INVITE request of a SIP (Session Initiation Protocol) protocol.

In one embodiment the message with the REL token is transferred by an http or SIP protocol.

In a third aspect of the embodiments a method is provided for providing coded application data, in which application data coded with a license key is transmitted from a server to a terminal, the license key is transmitted as a REL token according to a method for providing the REL token according to the first or second aspect of the embodiments from the server to the terminal and in which the terminal decodes the coded application data based on the REL token.

In a fourth aspect of the embodiments a method is provided for downloading the application data, in which a terminal transmits a REL token according to a method for providing the REL token according to the first or second aspect to a server and the server releases application data to the terminal as a function of the REL token.

In a fifth aspect a terminal is provided with a receive facility (receiver) for receiving messages according to an SAML (Security Assertion Markup Language) protocol or a MIME (Multipurpose Internet Mail Extension) protocol and for extracting a REL (Rights Expression Language) token from one of the messages, a decryption facility (decrypter) for decrypting received encrypted application data based on the REL token and with a data processing facility for processing the decrypted application data.

In a sixth aspect a terminal is provided with a storage unit for storing at least one REL (Rights Expression Language) token and with an output facility for sending the REL token by way of a message according to an SAML (Security Assertion Markup Language) protocol or according to a MIME (Multipurpose Internet Mail Extension) protocol.

In a seventh aspect a server is provided with a database for providing encrypted application data, a key management facility for providing at least one REL token with a license key for decrypting the encrypted application data, and with an output facility for sending the encrypted application data and for sending the REL (Rights Expression Language) token by a message according to an SAML (Security Assertion Markup Language) protocol or a MIME (Multipurpose Internet Mail Extension) protocol.

In one embodiment a receive facility is provided to receive a REL (Rights Expression Language) token by way of a message according to an SAML (Security Assertion Markup Language) protocol or a MIME (Multipurpose Internet Mail Extension) protocol.

In an eighth aspect a system is provided, which comprises at least one of the preceding terminals and at least one of the preceding servers, in which the terminal and/or the server has an output facility for sending the REL (Rights Expression Language) token by a message according to an SAML (Security Assertion Markup Language) protocol or a MIME (Multipurpose Internet Mail Extension) protocol.

A data medium with stored program commands for executing a method according to one of the above aspects is also provided.

A data medium with stored data, which executes one of the preceding methods during downloading and execution by a processing facility provided for the data storage unit is also provided.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
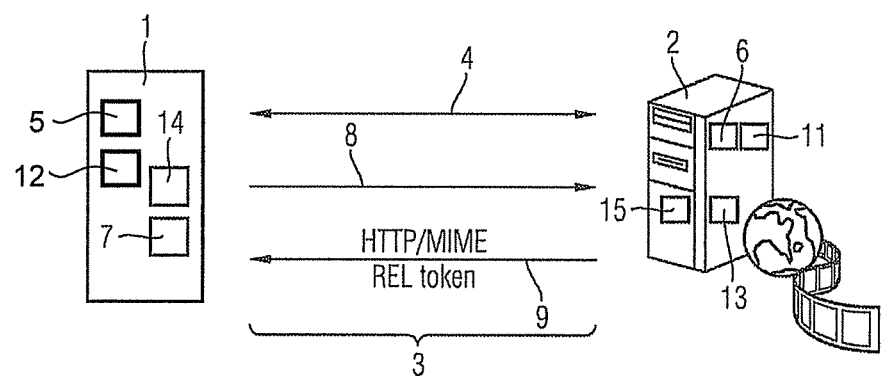
FIG. 1 shows a block diagram to explain a first embodiment.

Reference will now be made in detail to the preferred embodiments, examples of which are illustrated in the accompanying drawings, wherein like reference numerals refer to like elements throughout.

A first embodiment is explained in relation to FIG. 1.

A user searches for user data corresponding to his/her interest. This user data may be a film, a television program, a live transmission, a book, a magazine article, music content, etc. The user data is provided by a service provider.

A terminal 1 of the user serves to select user data. The terminal 1 is connected by way of a data channel to a server 2 of the service provider. The data channel can be effected by way of an IP/TCP connection 3, e.g. using an http, SIP or other protocol. For mobile terminals 1, such as mobile telephones, PDAs, laptops, the data channel is typically set up between the terminal 1 and the server 2 by way of a heterogeneous network with radio links. A portal, e.g. an internet page, is provided on the server 2 to allow the selection of desired user data.

The terminal 1 transmits a request 4 for selected user data. The user data can then be transmitted from the server 2 by way of the data channel to the terminal 1. It may prove expedient to transmit the user data by way of a new data channel with different characteristics, e.g. higher bandwidth, higher minimum quality of service (QoS). This is particularly important for continuous transmission, e.g. so-called streaming. A corresponding data channel is set up between the terminal 1 and the server 2.

The terminal 1 can be suitable at the same time for playing, displaying, processing and/or storing user data. A corresponding data processing facility (data processor) 5 for the user data is integrated in the terminal 1.

The application data is stored on the server 2 in a database 11. The server 2 has an encryption facility (encrypter) 6. This encryption facility 6 encrypts at least some of the user data before it is transmitted to the user and his/her terminal 1. In this manner the service provider ensures that the user pays for the user data. The license keys can be stored in a key management facility (storage) 13. In one alternative the application data is already encrypted beforehand and stored on the server 2 with the associated license keys in the database 11 or key management facility 13.

The customer can view the parts of the user data which are not encrypted to gain an impression of the content of the user data.

To release the encrypted part of the user data, the customer requires a license key from the service provider. The terminal 1 may have a decoder unit 7, which decrypts the encrypted user data with the aid of the license key. The service provider provides the terminal 1 with this license key or license for short.

For the server 2 to transfer the license key to the terminal 1, the customer requires authentication and accounting on the part of the service provider. Authentication can take place by transmitting an address, e.g. by inputting an ID for the customer's mobile radio connection at an internet portal, or in many other ways. Accounting can also take place by way of an internet portal or in the conventional manner by a written contract or similar.

If the customer decides to purchase the user data, he/she requires the license key from the server 2 as set out above. To this end the terminal 1 transmits a request 8 to the server, asking the server 2 to transfer the license key to the terminal 1.

Further to this request the server 2 transfers the license key 9 to the terminal 1. At the same time the server 2 uses an accounting system to initiate the corresponding debit entry or billing for the user data released by the license key. The terminal 1 uses the received license key to release and decode the user data.

We will now look at the transfer of the license key to the terminal 1. A protocol and messages of the protocol with known syntax are provided for this purpose. The terminal 1 can thus request the license key and extract the requested license key from a received message.

As far as the license key is concerned, a standard is defined using the keyword Right Expression Language (REL) with the reference ISO/IEC 21000-5. The license key is transmitted on the basis of this standard in this and the other embodiments.

Figure 2:
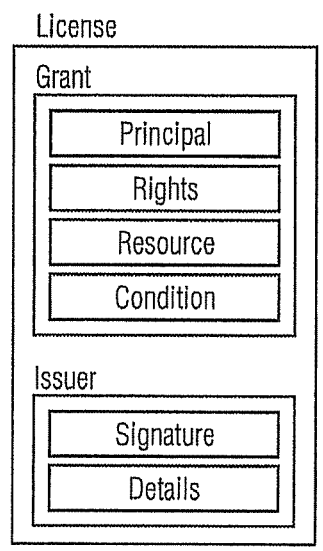
FIG. 2 shows a diagram to explain the structure of a REL token.

The standard REL provides for a so-called REL token, in which the license key is encapsulated with further data. Such a REL token can look like the one shown in FIG. 2.

Under "Grant" it is specified for what the license key is valid. This includes who the license was issued to (principal), which rights have been purchased (rights), the associated user data (resource) and optionally a condition (condition). The rights can for example include: only being able to view, store and/or modify the user data. The user data can be one of the types of user data mentioned above. A typical condition determines the period of validity of the REL token and therefore the license key.

The REL token also typically includes the issuer of the license key ("Issuer"), a non-forgeable signature ("Signature") and optionally details such as the time of issue. In the exemplary embodiment the issuer is the server 2 of the service provider.

The REL token is transmitted from the server 2 to the terminal 1.

In this embodiment provision is made for the REL token to be transferred in the form of an email, which is MIME-based. MIME (Multi-purpose Internet Mail Extension) allows the transmission of non-text-based content by an email. The MIME protocol provides the MIME type as a parameter. It is defined in the MIME type whether the email transports text-based, binary, application-based or other types of application data.

The media type is set to "application" for transmission of the REL token. Also a MIME subtype, a further parameter of the MIME protocol, is defined for the MIME email, namely rel+xml.

Specifications can now optionally be made in respect of the coding of characters, e.g. UTF-8 or UTF-16. If a transmission takes place according to a 7-bit transport, the UTF-8 or UTF-16 coded characters have to be coded in Base 64 or Quoted Printable. With an 8-bit transport, e.g. 8-bit MIME ISMTP or NNTP no UTF-8 coding is required. The UTF-16 family must be coded in Base 64. With a purely binary transmission, e.g. http, no content transfer encoding is required.

The MIME email can be transmitted by way of an http protocol or a SIP protocol.

The terminal 1 has a receive facility (receiver) 12 for receiving the MIME email. The receive facility 12 processes the protocol of the MIME email and extracts the REL token. The REL token is forwarded to a decryption facility (decrypter) 14. The decryption facility 14 uses the REL token and the license key contained therein to decode the coded application data. The application data can then be processed, displayed and/or stored by the output facility 15.

A secure MIME can be used instead of a MIME email. The secure MIME email allows encryption of the data transmitted from the server 2 to the terminal 1. It is thus possible to prevent or at least make it extremely difficult for third parties to spy out the REL token.

A further embodiment is based on the above embodiment. Instead of a MIME email the REL token is transmitted with the Security Assertion Mark-up Language (SAML) protocol.

To this end the SAML protocol is extended to be able to accommodate the REL token. The REL token can be embedded in the "Authorization Decision Statement", as in the source text below, for this purpose.

```
<saml:Assertion xmlns:saml="urn:oasis:names:tc:SAML:1.0:assertion
MajorVersion="1"MinorVersion="1" Issuer=https://idp.edu/saml/ ...>
<saml:Conditions NotBefore:"..." NotAfter="..."/>
<saml:AuthenticationStatement
AuthenticationMethod="urn:oasis:names:tc:SAML:1.0:am:X509-PKI"
AuthenticationInstant="...">
<saml:Subject>...</saml:Subject>
</saml:AuthenticationStatement>
<saml:AuthorizationDecisionStatement Resource="REL Authority">
–>REL <r:license xmlns:r="..."xmlns:wsu="..." wsu:Id="SecurityToken
19ef375268">
–> REL </r:license>
<saml:Subject>...</saml:Subject>
</saml:AuthorizationDecisionStatement>
</saml:Assertion>
```

The system of the REL token at the point illustrated above is only exemplary. The REL token can also be embedded in other elements within the SAML assertion.

The request for a REL token can also be made in the SAML syntax. The requests (request types) of the SAML syntax can be extended by an appropriate request. This new request requests the REL token, e.g. SAML:RELTOKENREQUEST. The request can then be answered by the server 2 by a new message type, e.g. SAML:RELTOKENRESPONSE. The REL token can be transmitted in this message type.

Figure 3:
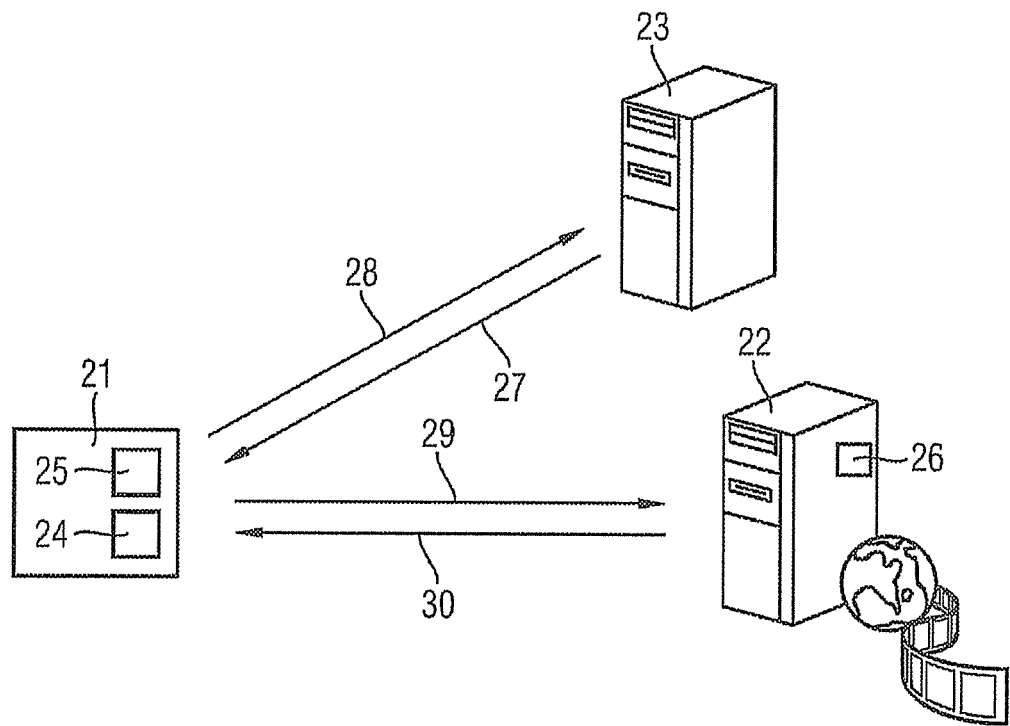
FIG. 3 shows a block diagram to explain a second embodiment.

A further application or embodiment is shown in FIG. 3. One scenario underlying the embodiment may be as follows. A customer wishes to purchase application data from a service provider. The application data is encrypted as before. The customer requires the corresponding license key in the form of a REL token, either to be able to download the data from the service provider or to be able to decrypt the data once it is downloaded. In this exemplary embodiment, however, the customer does not purchase the REL token from the service provider but from a third party provider or licenser. The third party provider may be a university, for example, or another organization, which generally allows its members a license to access the user data of the service provider. The members are the customers in this instance.

A terminal 21, e.g. identical to the terminal 1, generates a request 28 for a REL token. This request 28 may be, for example, in the form of an SAML request according to the SAML protocol, as explained in the context of the previous embodiment. This request is transferred from the terminal 21 to a license server 23 of the third party provider. The license server 23 of the third party provider provides the REL token for the terminal 21. The REL token is embedded into a MIME email 27 and transmitted to the terminal 21 of the customer. Or alternatively the REL token is transmitted in an SAML syntax.

The terminal 21 accepts the REL token and forwards it by way of an output facility 25 to the server 22 of the service provider. The transfer can take place in the form of the MIME email or with the SAML protocol 29. The server 22 has a receive facility (receiver) 26, which corresponds essentially to the receive facility 12 of the terminal 1 described above. If the REL token corresponds to REL tokens stored in a key management facility 13, the server 2 releases the user data 30. The user data 30 is transferred to the terminal 21 of the customer.

The above embodiments respectively purchase a REL token for a set of application data. In another embodiment the REL token is specifically for different application data. The terminal 21 stores the REL token in a storage unit 24. With the request for new application data the REL token is transferred to the server 22 of the service provider by way of the output facility (unit) 25. The request to the server 22 to provide new application data can be made by way of a SIP protocol. The REL token can be embedded in the initial INVITE request of the SIP protocol. The application data is then released to the terminal 21 by the server. A single sign on method allows multiple use of the REL token.

In one embodiment of the above method the server 22 releases the application data and transmits it unencrypted to the terminal 21. This means that the processing outlay both on the part of the server 22 and on the part of the terminal 21 is low as encryption and decryption are not required.

The system also includes permanent or removable storage, such as magnetic and optical discs, RAM, ROM, etc. on which the process and data structures of the present embodiment can be stored and distributed and computers or processors upon which the system can be implemented. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A method for providing at least one Rights Expression Language (REL) token and providing coded application data, comprising:
   transmitting coded application data having a license key from the server to the terminal:
   transmitting the license key, separate from the coded application data, as the Rights Expression Language (REL) token from the server to the terminal via a Multipurpose Internet Mail Extension (MIME) protocol: and
   decoding, by the terminal, the coded application data based on the REL token,
   wherein the message with the REL token is transferred by means of a Session Initiation Protocol (SIP) protocol,
   wherein the REL token is a machine-processable expression of data status that creates a protocol specifying a form of a license key where the license key is embedded in the REL token.

2. The method as claimed in claim 1, wherein the REL token is provided in an email by means of the MIME protocol.

3. The method as claimed in claim 2, wherein the REL token is provided by the server, after the terminal has requested the REL token from the server.

4. A method for providing at least one Rights Expression Language (REL) token, comprising providing the at least one REL token in a message via a Multipurpose Internet Mail Extension (MIME) protocol from a server to a terminal,
   wherein the message with the REL token is provided in an INVITE request of a Session Initiation Protocol (SIP) protocol,
   wherein the REL token is a machine-processable expression of data status that creates a protocol specifying a form of a license key where the license key is embedded in the REL token.

5. A method for providing at least one Rights Expression Language (REL) token AND downloading application data, comprising:
   transmitting, by a terminal, at least one Rights Expression Language (REL) token to a server via a Multipurpose Internet Mail Extension (MIME) protocol, and
   releasing, separate from the REL token transmitting, by the server the application data for the terminal as a function of the REL token,
   wherein a message with the REL token is transferred by means of a Session Initiation Protocol (SIP) protocol,
   wherein the REL token is a machine-processable expression of data status that creates a protocol specifying a form of a license key where the license key is embedded in the REL token.

6. A terminal, comprising:
   a receiver receiving messages according to a Multipurpose Internet Mail Extension (MIME) protocol and extracting a Rights Expression Language (REL) token from one of the messages;
   a decoder decrypting received encrypted application data based on the extracted REL token; and
   a data processor processing the decrypted application data,
   wherein the message with the REL token is received in an INVITE request of a Session Initiation Protocol (SIP) protocol,
   wherein the REL token is a machine-processable expression of data status that creates a protocol specifying a form of a license key where the license key is embedded in the REL token.

7. A terminal, comprising:
   a storage unit storing at least one Rights Expression Language (REL) token; and
   an output facility sending the REL token via a message according to a Multipurpose Internet Mail Extension (MIME) protocol,
   wherein the message with the REL token is provided in an INVITE request of a Session Initiation Protocol (SIP) protocol,
   wherein the REL token is a machine-processable expression of data status that creates a protocol specifying a form of a license key where the license key is embedded in the REL token.

8. A server, comprising:
   a database providing encrypted application data;
   a key management storage providing at least one Rights Expression Language (REL) token with a license key for decrypting the encrypted application data; and
   an output facility sending the encrypted application data and sending the REL token via a Multipurpose Internet Mail Extension (MIME) protocol,
   wherein the message with the REL token is provided in an INVITE request of a Session Initiation Protocol (SIP) protocol,
   wherein the REL token is a machine-processable expression of data status that creates a protocol specifying a form of a license key where the license key is embedded in the REL token.

9. The server as claimed in claim 8, further comprising a receiver receiving the REL token via a message according to a Multipurpose Internet Mail Extension (MIME) protocol.

10. A system, comprising:
    at least one terminal; and
    at least one server, and
    wherein the terminal and/or the server has an output facility for sending a Rights Expression Language (REL) token via a message according to a Multipurpose Internet Mail Extension (MIME) protocol,
    wherein the message with the REL token is provided in an INVITE request of a Session Initiation Protocol (SIP) protocol,
    wherein the REL token is a machine-processable expression of data status that creates a protocol specifying a form of a license key where the license key is embedded in the REL token.

11. A non-transitory computer readable data medium with stored program commands for executing a method of providing at least one Rights Expression Language (REL) token in a message via a Multipurpose Internet Mail Extension (MIME) protocol from a server to a terminal,
    wherein the message with the REL token is provided in an INVITE request of a Session Initiation Protocol (SIP) protocol,
    wherein the REL token is a machine-processable expression of data status that creates a protocol specifying a form of a license key where the license key is embedded in the REL token.

* * * * *